(12) United States Patent
Giles et al.

(10) Patent No.: US 11,049,709 B2
(45) Date of Patent: Jun. 29, 2021

(54) ION TRAP MASS SPECTROMETERS WITH SPACE CHARGE CONTROL

(71) Applicant: Micromass UK Limited, Wilmslow (GB)

(72) Inventors: Kevin Giles, Stockport (GB); Martin Raymond Green, Bowdon (GB); Keith Richardson, Derbyshire (GB); Jason Lee Wildgoose, Stockport (GB)

(73) Assignee: MICROMASS UK LIMITED, Wilmslow (GB)

( * ) Notice: Subject to any disclaimer, the term of this patent is extended or adjusted under 35 U.S.C. 154(b) by 984 days.

(21) Appl. No.: 15/035,952

(22) PCT Filed: Nov. 11, 2014

(86) PCT No.: PCT/GB2014/053334
§ 371 (c)(1),
(2) Date: May 11, 2016

(87) PCT Pub. No.: WO2015/071648
PCT Pub. Date: May 21, 2015

(65) Prior Publication Data
US 2016/0268114 A1 Sep. 15, 2016

(30) Foreign Application Priority Data

Nov. 12, 2013 (EP) .................................... 13192561
Nov. 12, 2013 (GB) .................................... 1319942

(51) Int. Cl.
*H01J 49/06* (2006.01)
*H01J 49/00* (2006.01)
*G01N 27/622* (2021.01)

(52) U.S. Cl.
CPC ............ *H01J 49/06* (2013.01); *G01N 27/622* (2013.01); *H01J 49/004* (2013.01)

(58) Field of Classification Search
CPC ... G01N 27/622; G01N 27/624; H01J 49/004; H01J 49/0031; H01J 49/426; H01J 49/4265
See application file for complete search history.

(56) References Cited

U.S. PATENT DOCUMENTS 5,572,022 A    11/1996   Schwartz et al.
6,906,319 B2 *   6/2005   Hoyes .................. H01J 49/004
                                                                      250/281

(Continued)

*Primary Examiner* — Brooke Purinton
(74) *Attorney, Agent, or Firm* — Kacvinsky Daisak Bluni PLLC

(57) ABSTRACT

A method of mass spectrometry or ion mobility spectrometry is disclosed comprising: providing ions towards an ion storage region; selecting a target maximum charge desired to be stored within the ion storage region at any given time; and reducing the ion current passing to the ion storage region such that the ions entering the ion storage region do not cause the total charge within the storage region to rise above said target maximum charge. The step of reducing the ion current passing to the ion storage region comprises: temporally separating the ions according to their ion mobility in an ion mobility separator; and mass filtering the ions according to mass to charge ratio with a mass filter. Said steps of separating and mass filtering the ions result in substantially only target ions having selected combinations of ion mobility and mass to charge ratio being transmitted towards the ion storage region. The method further comprises accumulating the target ions within the ion storage region during an ion accumulation period.

18 Claims, 1 Drawing Sheet

(56) References Cited

U.S. PATENT DOCUMENTS

| | | |
|---|---|---|
| 6,914,241 B2 | 7/2005 | Giles et al. |
| 6,960,761 B2 | 11/2005 | Clemmer |
| 6,992,283 B2 | 1/2006 | Bateman et al. |
| 7,077,944 B2 | 7/2006 | Clemmer |
| 7,095,014 B2 | 8/2006 | Hoyes |
| 7,297,939 B2 | 11/2007 | Bateman et al. |
| 7,586,088 B2 | 9/2009 | Bateman et al. |
| 8,445,845 B2 | 5/2013 | Green et al. |
| 8,952,320 B2 | 2/2015 | Bateman et al. |
| 9,012,840 B2 | 4/2015 | Bateman et al. |
| 2005/0211891 A1* | 9/2005 | Belov ............... G01N 30/7233 250/282 |
| 2005/0258359 A1* | 11/2005 | Guevremont ....... H01J 49/0018 250/288 |
| 2009/0230301 A1* | 9/2009 | furuhashi ............ H01J 49/4265 250/282 |
| 2010/0001180 A1* | 1/2010 | Bateman ............. H01J 49/0036 250/282 |
| 2010/0032561 A1* | 2/2010 | Giles .................. H01J 49/4235 250/283 |
| 2010/0108879 A1 | 5/2010 | Bateman et al. |
| 2010/0237237 A1* | 9/2010 | Green .................. H01J 49/004 250/283 |
| 2010/0282957 A1* | 11/2010 | Wouters .............. H01J 49/0031 250/252.1 |
| 2011/0189788 A1* | 8/2011 | Brown ................ H01J 49/0009 436/173 |
| 2014/0291504 A1 | 10/2014 | Richardson et al. |
| 2015/0041636 A1 | 2/2015 | Giles et al. |

\* cited by examiner

ION TRAP MASS SPECTROMETERS WITH SPACE CHARGE CONTROL

CROSS REFERENCE TO RELATED APPLICATION APPLICATIONS

This application is the National Stage of International Application No. PCT/GB2014/053334, filed 11 Nov. 2014 which claims priority from and the benefit of United Kingdom patent application No. 1319942.7 filed on 12 Nov. 2013 and European patent application No. 13192561.2 filed on 12 Nov. 2013. The entire contents of these applications are incorporated herein by reference.

BACKGROUND TO THE PRESENT INVENTION

The present invention provides a method of mass spectrometry and a mass spectrometer.

Many mass or ion mobility spectrometers include ion trapping devices. The performance of such ion trapping devices can vary greatly due to detrimental space charge effects, the effects of which vary depending on the amount of charge accumulated within the ion trap. The detrimental effects can range from loss of mass accuracy, through loss of resolution, ultimately to loss of signal as ions 'overflow' from the ion trap and are lost. This loss of signal can be both mass to charge ratio dependent and charge dependent, rendering the correction of such effects difficult.

These detrimental effects have led to the development of methods of controlling the ion population within trapping devices by which the sensitivity of the instrument is adjusted as a function of the incoming ion current so as to ensure that only a target number of ions enter the ion trap per analysis cycle. This reduces the amount of charge within the trapping region at a given time and hence reduces the space-charge effects. These techniques are commonly referred to as automatic gain control (AGC) techniques. However, whilst these approaches have proven useful, they fundamentally reduce the sensitivity of the system. For example, it is not unusual in proteomics experiments on Orbitrap (RTM)-FTMS instruments operating with automatic gain control to see the duty cycle, and therefore also the sensitivity, of the instrument reduced by three orders of magnitude or more so as to avoid space charge effects.

It is therefore desired to provide an improved method of mass spectrometry or ion mobility spectrometry and an improved mass spectrometer or ion mobility spectrometer.

SUMMARY OF THE PRESENT INVENTION

From a first aspect the present invention provides a method of mass spectrometry or ion mobility spectrometry comprising:

providing ions towards an ion storage region;

selecting a target maximum charge desired to be stored within the ion storage region at any given time; and reducing the ion current passing to the ion storage region such that the ions entering the ion storage region do not cause the total charge within the storage region to rise above said target maximum charge, wherein said step of reducing the ion current passing to the ion storage region comprises:

temporally separating the ions according to their ion mobility in an ion mobility separator; and mass filtering the ions according to mass to charge ratio with a mass filter;

wherein said steps of separating and mass filtering the ions result in substantially only target ions having selected combinations of ion mobility and mass to charge ratio being transmitted towards the ion storage region; and wherein said method further comprises accumulating the target ions within the ion storage region during an ion accumulation period.

The present invention alleviates the charge capacity limitations of ion trapping devices by reducing the ion current into the ion trapping region in a manner that also enriches target ions of interest within the trapping device. The present invention therefore improves the sensitivity of charge capacity limited devices for the target ions.

EP 1365438 discloses a method of selecting charge states by transmitting ions having desired combinations of ion mobilities and mass to charge ratios. However, EP 1365438 does not recognise that the combination of an ion mobility separator and a mass filter can be used to fill an ion storage region only with target ions of interest whilst simultaneously preventing a target maximum charge capacity of the ion storage region from being exceeded. Preferably, the present invention uses only the filter to attenuate the ions and so the target maximum charge capacity is prevented from being exceeded without losing target ions. The is in contrast to the use of conventional attenuation devices, which attenuate all ions, including target ions.

Preferably, said steps of separating and mass filtering the ions result in only target ions having selected combinations of ion mobility and mass to charge ratio being transmitted towards the ion storage region. Other ions are filtered out by the mass filter.

Preferably, the mass to charge ratios of the ions transmitted to the ion storage region by the mass filter vary with time such that different ions are transmitted by the mass filter at different times.

Preferably, the mass filter is arranged downstream of the ion mobility separator and the mass to charge ratios of the ions transmitted by the mass filter vary as a function of the drift time of the ions through the ion mobility separator such that only ions having selected combinations of drift times and mass to charge ratios are transmitted to the ion storage region.

The ion mobility separator and mass filter only transmit ions having desired combinations of ion mobility and mass to charge ratio to the ion storage region. These combinations are preferably pre-determined so that only ions of interest are transmitted to the ion storage region.

The mass to charge ratios of the ions transmitted by the mass filter may vary with time in a continuous manner or in a stepped manner.

The mass to charge ratios of the ions transmitted by the mass filter may increase and/or decrease with time.

The mass filter may transmit mass to charge ratios that increase progressively with time up to an upper mass to charge ratio, and the mass filter may then switch so as to transmit mass to charge ratios at a lower mass to charge ratio. The mass filter may then transmit mass to charge ratios that increase progressively with time from the lower mass to charge ratio.

Additionally, or alternatively, the mass filter may transmit mass to charge ratios that decrease progressively with time down to a low mass to charge ratio, and the mass filter may then switch so as to transmit mass to charge ratios at a higher mass to charge ratio. The mass filter may then transmit mass to charge ratios that decrease progressively with time from the higher mass to charge ratio.

The mass to charge ratios transmitted by the mass filter may increase and/or decrease in a continuous, non-continuous manner or stepped manner.

Preferably, said steps of separating and mass filtering the ions are not used to select the charge states of ions transmitted.

Preferably, the ions are pulsed into the ion mobility separator in a plurality of pulses of ions and the mass to charge ratio transmittal window of the mass filter is varied with drift time as the ions from each pulse emerge from the ion mobility separator. The mass to charge ratio transmittal window of the mass filter may be varied with drift time in the same manner for each pulse of ions pulsed into the ion mobility separator. Alternatively, the mass to charge ratio transmittal window of the mass filter may be varied with drift time in a different manner for each pulse of ions pulsed into the ion mobility separator.

The ion mobility separator preferably performs one or more separation cycles; wherein for each cycle, ions are pulsed into the ion mobility separator, the ions separate according to their ion mobilities, and the ions then exit the ion mobility separator. The operation of the mass filter is preferably synchronised with the operation of the ion mobility separator such that during said ion accumulation period the ion storage region is filled with target ions only from an integer number of said separation cycles. Controlling the mass filter and ion mobility separator in this manner ensures that the target maximum charge to be stored in the ion storage region is not exceeded, whilst ensuring that all target ions in a given cycle are stored so as to prevent discrimination between target ions stored in said given cycle.

Preferably, target ions from one or more complete cycles enter the ion storage region, whereas ions from partial cycles do not enter the ion storage region.

The integer number of cycles are preferably a plurality of consecutive cycles.

The integer number of cycles is n cycles, preferably wherein $n \geq 1$; $n \geq 2$; $n \geq 3$; $n \geq 4$; $n \geq 5$; $n \geq 6$; $n \geq 7$; $n \geq 8$; $n \geq 9$; $n \geq 10$; $n \geq 15$; $n \geq 20$; or $n \geq 25$.

The method may comprise performing an ion blocking mode that prevents ions being transmitted to the ion storage region other than when said target ions from said integer number of cycles are being transmitted to the ion storage region.

The ion blocking mode may comprise applying a voltage to the mass filter or spectrometer that causes all ions to be unstable in the mass filter, or that forms a potential barrier for ions, such that ions are not transmitted to the ion storage region in the ion blocking mode.

The method may comprise selecting a desired maximum ion current into the ion storage region and the mass filter may be controlled so as to filter out ions such that the ions entering the ion storage region do not have an ion current above said maximum ion current.

The ion storage region has a target maximum charge desired to be stored within the ion storage region and the mass filter is controlled so as to filter out ions such that the ions entering the ion storage region do not cause the total charge within the storage region to rise above said target maximum charge.

The ions travelling towards the ion storage region may be attenuated substantially only by the mass filter.

The method may, less preferably, comprise providing an attenuation device in addition to the mass filter and using the attenuation device to attenuate the ion beam travelling to the ion storage region.

The attenuation device may be controlled so as to attenuate the ions travelling to the ion storage region such that the ions entering the ion storage region do not cause the total charge within the storage region to rise above said target maximum charge.

Alternatively, or additionally, the method may comprise setting a desired maximum ion current into the ion storage region and the attenuation device may be controlled so as to attenuate the ions travelling to the ion storage region such that the ions entering the ion storage region do not have an ion current above said maximum ion current.

The attenuation device preferably attenuates ions independently of their ion mobility such that ions of all ion mobilities transmitted by the separator are attenuated.

The ion mobility separator preferably performs one or more separation cycles; wherein for each cycle, ions are pulsed into the ion mobility separator, the ions separate according to their ion mobilities and the ions exit the ion mobility separator. When the ion accumulation period is shorter than said cycle the above described attenuation device is preferably used.

The attenuation device may, for example, comprise a defocusing lens for defocusing ions and an aperture. The ions may be attenuated by being defocussed such that only some of the ions are transmitted though the aperture to the ion storage region.

The attenuation device may operate by reducing the ion transmission to the ion storage region, preferably wherein the level of attenuation is varied as a function of ion mobility separator cycle time. Alternatively, or additionally, the attenuation device may operate by reducing the duty cycle of ions transmitted to the ion storage region. The duty cycle may be adjusted by transmitting ions from only some IMS cycles and not others. The attenuation device may be located upstream and/or downstream the ion mobility separator.

Although embodiments are described wherein said attenuation device is provided, it is also contemplated that no such attenuation device is provided. In the latter embodiments, the mass filter is the only device that actively (and deliberately) attenuates the ion beam travelling towards the ion storage region. In these embodiments it is substantially only the mass filter that maintains the charged store in the ion storage region at or below the target maximum charge, or that maintains the ion current into the ion storage region below the maximum ion current.

The ion storage region may be an ion trap mass analyser and ions may be mass analysed by the ion trap mass analyser.

Alternatively, the method further comprises releasing ions from the ion storage region to a mass analyser or ion mobility analyser and analysing the ions therein.

The ion storage region may be part of a Fourier transform mass spectrometer, such as a FT-ICR or Orbitrap (RTM) mass spectrometer. The ion storage region may be a fragmentation or reaction region. The ion storage region may be an ETD, ECD or a PTR region.

Although it is preferred that the ions are separated in the ion mobility separator prior to being mass filtered in the mass filter, it is contemplated that less preferably the ions may be mass filtered by the mass filter before being separated in the ion mobility separator.

The ion mobility separator may comprise a gas that separates the ions according to their ion mobility through the gas. Alternatively, other IMS devices such as differential mobility analyser (DMA) or differential mobility spectrometer (DMS) may be used.

The ion mobility separator and mass filter of the present invention operate together so as to transmit target ions of interest to the ion storage region and filter out other ions. The method may comprise performing a survey scan prior to this for identifying which ions are the target ions. For example, a data dependent analysis (DDA) may be performed during which ions of interest are identified and then these ions become the target ions that are selectively transmitted to the ion storage region by the ion mobility separator and mass filter.

The ions stored in the ion storage region may be analysed by a mass analyser or ion mobility analyser.

The ion trap may be used as a fragmentation device. Ions in the ion storage region may be fragmented according to any known fragmentation technique. The resulting fragment ions may be mass analysed or analysed in an ion mobility analyser. Alternatively, the ion trap may be used as a reaction device for reacting reagent ions with the target ions. The resulting ions may be mass analysed or analysed in an ion mobility analyser.

The ion trap may be preceded or followed by a fragmentation or reaction device/cell.

The ion storage region may be a mass selective ion trap or an ion trap mass analyser. Alternatively, the ion trap may act as an ion accumulator for temporarily storing and releasing ions into a downstream mass analyser, ion mobility analyser or further ion trap. Examples of such downstream mass analysers include a ToF mass analyser or a quadrupole mass analyser.

As described above, the method may operate so as to fill the ion storage region with a target number of ions, or to maintain the number of ions in the ion storage region below a target value. In cases where a target number of ions exists then the sensitivity of the instrument may be selectively reduced via control of duty cycle, e.g. as in U.S. Pat. No. 5,572,022. Alternatively, the sensitivity of the instrument may be reduced by controlling the transmission rate of ions to the ion storage region, e.g. as in U.S. Pat. No. 8,445,845.

Ions may be pulsed into the ion mobility separator in a plurality of pulses of ions, wherein the mass to charge ratio transmittal window of the mass filter is varied with drift time as the ions from each pulse emerge from the ion mobility separator. Each pulse of ions is subjected to an ion mobility separator cycle in the ion mobility separator so as to separate the ions in each pulse according their ion mobility. The sensitivity of the spectrometer may be controlled by controlling the number of ion mobility separator cycles for which target ions are transmitted to the ion storage region. The number of ion mobility separator cycles for which target ions are transmitted to the ion storage region may therefore be varied.

Ions may be pulsed into the ion mobility separator in a plurality of pulses of ions, wherein the mass to charge ratio transmittal window of the mass filter is varied with drift time as the ions from each pulse emerge from the ion mobility separator. Target ions from only a single pulse may enter and be confined in the ion storage region at any given time. Alternatively, target ions from multiple ion pulses may be confined in the ion storage region at once.

Ion mobility separators such as a differential mobility analyser (DMA) or a differential mobility spectrometer (DMS) may be used.

The preferred embodiment operates a mass filter in synchronisation with an ion mobility separator so as to improve specificity of the spectrometer by removal of unwanted interference ions, and also to improve precursor ion selection duty cycle by selecting multiple precursor ions within a single ion mobility separation cycle.

Said ion accumulation period is preferably the period of time over which target ions are accumulated within the ion storage region, substantially without target ions being released from the ion storage region.

The present invention also provides a mass spectrometer or ion mobility spectrometer comprising:

an ion source;

an ion storage region having a target maximum charge desired to be stored within the ion storage region at any given time;

an ion mobility separator and a mass filter arranged between the ion source and the ion storage region; and control means arranged and configured for reducing the ion current passing from the ion source to the ion storage region such that the ions entering the ion storage region do not cause the total charge within the storage region to rise above said target maximum charge, wherein the control means reduces the ion current passing to the ion storage region by:

temporally separating the ions according to their ion mobility in the ion mobility separator; and mass filtering the ions according to mass to charge ratio with the mass filter;

wherein the control means causes target ions having selected combinations of ion mobility and mass to charge ratio to be transmitted towards the ion storage region and accumulated therein.

The mass spectrometer may be arranged an configured with control means for performing any one of the methods described above.

The spectrometer may further comprise means for selecting the target maximum charge to be stored within the ion storage region at any given time. The control means then controls the spectrometer such that the ions entering the ion storage region do not cause the total charge within the storage region to rise above said target maximum charge.

Although the present invention has been described above as separating ions according to their ion mobility it is contemplated that ions may be separated according to a physicochemical property other than ion mobility, such as charge state, mass, chirality, ionisation potential, chemical properties, functional groups or bond strength.

Additionally, or alternatively, although the present invention has been described above as filtering ions according to their mass to charge ratio it is contemplated that ions may be filtered according to a physicochemical property other than mass to charge ratio, such as charge state, mass, chirality, ionisation potential, chemical properties, functional groups or bond strength.

Accordingly, from a second aspect the present invention provides a method of mass spectrometry or ion mobility spectrometry comprising:

providing ions towards an ion storage region;

selecting a target maximum charge desired to be stored within the ion storage region at any given time; and reducing the ion current passing to the ion storage region such that the ions entering the ion storage region do not cause the total charge within the storage region to rise above said target maximum charge, wherein said step of reducing the ion current passing to the ion storage region comprises:

temporally separating the ions according to a first physiochemical property in an ion separator; and filtering the ions according to a second, different physiochemical property with an ion filter;

wherein said steps of separating and filtering the ions result in substantially only target ions having selected combinations of first and second physiochemical properties being transmitted towards the ion storage region; and wherein said method further comprises accumulating the target ions within the ion storage region during an ion accumulation period.

The second aspect of the present invention also provides a mass spectrometer or ion mobility spectrometer comprising:

an ion source;

an ion storage region having a target maximum charge desired to be stored within the ion storage region at any given time;

an ion separator for separating ions according to a first physiochemical property;

an ion filter for filtering ions according to a second, different physiochemical property;

wherein the ion separator and ion filter are arranged between the ion source and the ion storage region;

said spectrometer further comprising control means arranged and configured for reducing the ion current passing from the ion source to the ion storage region such that the ions entering the ion storage region do not cause the total charge within the storage region to rise above said target maximum charge, wherein the control means reduces the ion current passing to the ion storage region by:

temporally separating the ions according to the first physiochemical property in the ion separator; and filtering the ions according to the second physiochemical property with the ion filter;

wherein the control means causes target ions having selected combinations of first and second physiochemical properties to be transmitted towards the ion storage region and accumulated therein.

The spectrometer may further comprise means for selecting the target maximum charge to be stored within the ion storage region at any given time. The control means then controls the spectrometer such that the ions entering the ion storage region do not cause the total charge within the storage region to rise above said target maximum charge.

The method or spectrometer according to the second aspect of the present invention may comprise any one of the optional features described in relation to the first aspect of the present invention, except that where these optional features describe the ion mobility of the ions this is to be construed more broadly as a first physiochemical property of the ions. Similarly, where these optional features describe the mass to charge ratio of the ions this is to be construed more broadly as a second physiochemical property of the ions that is different to said first physiochemical property.

Although the present invention has been described in relation to the prevention of space-charge effects in ion storage regions, it is also contemplated that the selective transmission of ions may be used for other advantages. For example, it may be desirable to react precursor ions with reactant ions in a reaction region. However, the reaction region will contain only a limited number of reactant ions and it is desired that these reactant ions react with target precursor ions, rather than other precursor ions or background ions.

Accordingly, from a third aspect, the present invention provides a method of mass spectrometry or ion mobility spectrometry comprising:

providing first ions towards an ion reaction region;

selecting a target maximum charge desired to be stored within the ion reaction region at any given time;

providing reactant ions or molecules in the reaction region; and reducing the ion current passing to the ion reaction region such that the ions entering the reaction region do not cause the total charge within the reaction region to rise above said target maximum charge, wherein said step of reducing the ion current passing to the reaction region comprises:

temporally separating the first ions according to their ion mobility in an ion mobility separator; and mass filtering the first ions according to mass to charge ratio with a mass filter;

wherein said steps of separating and mass filtering the ions result in only target ions having selected combinations of ion mobility and mass to charge ratio being transmitted into the ion reaction region; and reacting the target ions with the reactant ions or molecules in the reaction region so as to produce product ions.

Although the ions have been described as being separated according to ion mobility, they may alternatively be separated according to another, first, physiochemical property.

Although the ions have been described as being filtered according to mass, they may alternatively be filtered according to another, second, physiochemical property.

The method according to the third aspect of the present invention may comprise any one, or any combination, of the optional or preferred features described in relation to the first aspect of the present invention, except wherein the ion storage region is said reaction region.

Preferably, the mass to charge ratios of the ions transmitted to the ion reaction region by the mass filter vary with time such that different ions are transmitted by the mass filter at different times.

Preferably, the mass filter is arranged downstream of the ion mobility separator and the mass to charge ratios of the ions transmitted by the mass filter vary as a function of the drift time of the ions through the ion mobility separator such that only ions having selected combinations of drift times and mass to charge ratios are transmitted to the ion reaction region.

The mass to charge ratios of the ions transmitted by the mass filter may vary with time in a substantially continuous manner or in a stepped manner.

The first ions may be pulsed into the ion mobility separator in a plurality of pulses of ions, wherein the mass to charge ratio transmittal window of the mass filter is varied with drift time as the ions from each pulse emerge from the ion mobility separator; and wherein the mass to charge ratio transmittal window of the mass filter is varied with drift time in the same or in a different manner for each pulse of ions pulsed into the ion mobility separator.

The method may further comprise selecting a desired maximum ion current into the ion reaction region and the mass filter may be controlled so as to filter out ions such that the ions entering the ion reaction region do not have an ion current above said maximum ion current.

The ion reaction region may have a target maximum number of ions desired to be stored within the ion reaction region at any given time and the mass filter may be controlled so as to filter out ions such that the ions entering the ion reaction region do not cause the number of ions within the reaction region to rise above said target maximum charge.

An attenuation device may be provided in addition to the mass filter and may be used to attenuate the ion beam travelling to the ion reaction region. The ion reaction region may have has a target maximum number of ions desired to be stored within the ion reaction region at any one time and the attenuation device may be controlled so as to attenuate the ions travelling to the ion reaction region such that the ions entering the ion reaction region do not cause the total number of ions within the reaction region to rise above said target maximum charge. Additionally, or alternatively, the method may comprise setting a desired maximum ion current into the ion reaction region and the attenuation device may be controlled so as to attenuate the ions travelling to the ion reaction region such that the ions entering the ion reaction region do not have an ion current above said maximum ion current.

Product ions generated in the reaction region may be mass analysed and/or analysed in an ion mobility spectrometer.

A mass spectrometer or ion mobility spectrometer is also provided comprising:

an ion source;

an ion reaction region having a target maximum charge desired to be stored within the ion reaction region at any given time;

an ion mobility separator and a mass filter arranged between the ion source and the reaction region; and control means arranged and configured for reducing the ion current passing from the ion source to the reaction region such that the ions entering the reaction region do not cause the total charge within the reaction region to rise above said target maximum charge, wherein the control means reduces the ion current passing to the reaction region by:

temporally separating the ions according to their ion mobility in the ion mobility separator; and mass filtering the ions according to mass to charge ratio with the mass filter;

wherein the control means causes target ions having selected combinations of ion mobility and mass to charge ratio to be transmitted towards the reaction region and accumulated therein.

The spectrometer may further comprise means for selecting the target maximum charge to be stored within the reaction region at any given time. The control means then controls the spectrometer such that the ions entering the reaction region do not cause the total charge within the reaction region to rise above said target maximum charge.

The mass spectrometer may be arranged an configured with control means for performing any one of the methods described above.

Although the present invention has been described above as separating ions according to their ion mobility it is contemplated that ions may be separated according to a physicochemical property other than ion mobility, such as charge state, mass, chirality, ionisation potential, chemical properties, functional groups or bond strength.

Additionally, or alternatively, although the present invention has been described above as filtering ions according to their mass to charge ratio it is contemplated that ions may be filtered according to a physicochemical property other than mass to charge ratio, such as charge state, mass, chirality, ionisation potential, chemical properties, functional groups or bond strength.

Accordingly, from a fourth aspect the present invention provides a method of mass spectrometry or ion mobility spectrometry comprising:

providing first ions towards an ion reaction region;

selecting a target maximum charge desired to be stored within the ion reaction region at any given time;

providing reactant ions or molecules in the reaction region; and reducing the ion current passing to the ion reaction region such that the ions entering the reaction region do not cause the total charge within the reaction region to rise above said target maximum charge, wherein said step of reducing the ion current passing to the reaction region comprises:

temporally separating the first ions according to a first physicochemical property in an ion separator; and filtering the first ions according to a second, different physicochemical property with an ion filter;

wherein said steps of separating and filtering the ions result in only target ions having selected combinations of first and second physicochemical properties being transmitted into the ion reaction region; and reacting the target ions with the reactant ions or molecules in the reaction region so as to produce product ions.

The fourth aspect the present invention also provides a mass spectrometer or ion mobility spectrometer comprising:

an ion source;

an ion reaction region having a target maximum charge desired to be stored within the ion reaction region at any given time;

an ion separator and an ion filter arranged between the ion source and the reaction region; and control means arranged and configured for reducing the ion current passing from the ion source to the reaction region such that the ions entering the reaction region do not cause the total charge within the reaction region to rise above said target maximum charge, wherein the control means reduces the ion current passing to the reaction region by:

temporally separating the ions according to a first physicochemical property in the ion separator; and filtering the ions according to a second, different physicochemical property with the filter;

wherein the control means causes target ions having selected combinations of first and second physicochemical properties to be transmitted towards the reaction region and accumulated therein.

The spectrometer may further comprise means for selecting the target maximum charge to be stored within the reaction region at any given time. The control means then controls the spectrometer such that the ions entering the reaction region do not cause the total charge within the reaction region to rise above said target maximum charge.

The method or spectrometer according to the fourth aspect of the present invention may comprise any one of the optional features described in relation to the third aspect of the present invention, except that where these optional features describe the ion mobility of the ions this is to be construed more broadly as a first physicochemical property of the ions. Similarly, where these optional features describe the mass to charge ratio of the ions this is to be construed more broadly as a second physiochemical property of the ions that is different to said first physicochemical property The spectrometer described herein may comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The spectrometer may comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the spectrometer comprises a device arranged and adapted to supply an AC or RF voltage to the electrodes. The AC or RF voltage preferably has an amplitude selected from the group consisting of: (i)<50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi)>500 V peak to peak.

The AC or RF voltage preferably has a frequency selected from the group consisting of: (i)<100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv)>10.0 MHz.

The spectrometer may comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENT

Figure 1:
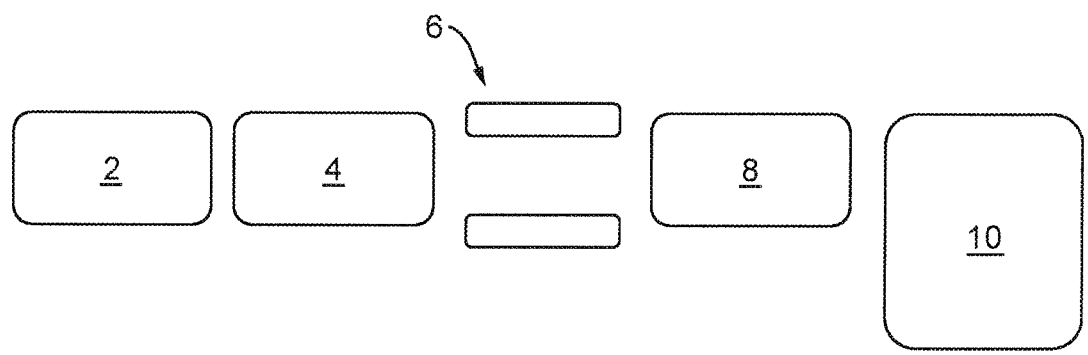
FIG. 1 shows a schematic of a mass spectrometer according to a preferred embodiment of the present invention.

FIG. 1 shows a schematic of a preferred embodiment of the present invention. This embodiment comprises an ion source 2, an ion mobility separator (IMS) 4, a quadrupole mass filter 6, an attenuation device 8 and an ion trap 10. In operation, ions are generated by the ion source 2 and are directed into the IMS device 4. Ions having different mobilities pass through the gas in the IMS device 4 with different drift times and so the IMS device 4 causes the ions to separate according to their ion mobility through the IMS device 4. The quadrupole mass filter 6 is arranged between the IMS device 4 and the attenuation device 8 and only transmits ions having a restricted range of mass to charge ratios at any given time. The mass to charge ratio transmission window of the quadrupole mass filter 6 is scanned with time whilst the ions emerge from the IMS device 4 such that the mass filter 6 mass selectively transmits ions from the IMS device 4 to the attenuation device 8.

The mass filter 6 may be scanned with time as a function of the drift time of the ions through the IMS device 4. As such, only ions having a selected combination of ion mobility and mass to charge ratio are transmitted through the mass filter 6 at any given time. This enables target ions to be selectively filtered from other ions, such as background matrix ions, and transmitted downstream towards the ion trap 10. Examples of target ions according to the preferred embodiments are lipid ions or multiply charged peptide ions. The method therefore reduces the ion current being transmitted to the ion trap 10 so as to avoid space charge effects in the ion trap 10, whilst simultaneously enriching the ion beam being transmitted to the ion trap with the desired target ions and filtering less desired ions. The ion trap 10 may be associated with a total charge desired to be within the ion trap 10 at any given time and the combination of the IMS device 4 and mass filter 6 may be operated to ensure that the charge within the ion trap 10 remains at or below this total charge.

The ions accumulated in the ion trap 10 are stored therein. The ion trap 10 may be an ion trap mass analyser for analysing the ions stored therein. For example, the ion trap 10 may mass selectively eject ions onto a detector so as to mass analyse the ions from the ion trap 10. Alternatively, the ion trap 10 may temporarily store ions and subsequently release the ions into a downstream mass analyser or ion mobility spectrometer for analysis therein. For example, the ion trap 10 may form part of a Fourier Transform mass spectrometer, such as an FT-ICR mass spectrometer. Alternatively, or additionally, the ion trap 10 may be a reaction region within a mass spectrometer, for example, the ion trap 10 may be a reaction device such as an ETD cell.

The use of the IMS device 4 and mass filter 6 to control the ion population entering the ion trap 10 will now be described with reference to FIGS. 2A and 2B.

Figure 2A:
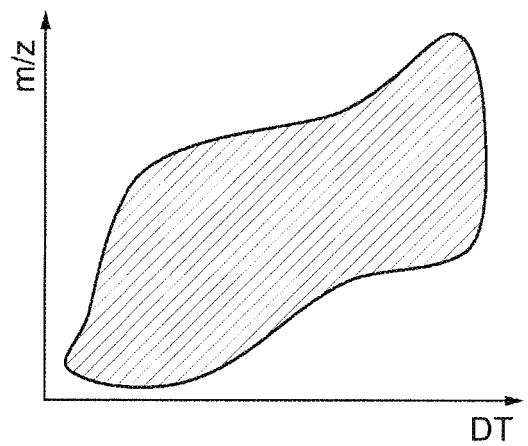
FIG. 2A illustrates a plot showing the ion distribution entering the mass filter of FIG. 1.

FIG. 2A illustrates the mass to charge ratios of the ions leaving the IMS device 4 and passing into the quadrupole mass filter 6 as a function of drift time through the IMS device 4. It will be observed that ions having a relatively wide range of mass to charge ratios, and hence a relatively large number of ions, exit the IMS device 4 at any given drift time.

Figure 2B:
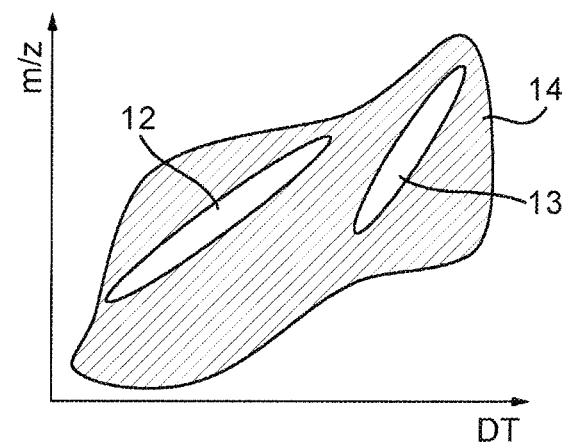
FIG. 2B illustrates a plot showing the ion distribution leaving the mass filter of FIG. 1.

FIG. 2B shows two regions 12,13 that represent plots of the mass to charge ratios of ions transmitted by the quadrupole mass filter 6, as a function of their drift times through the IMS device 4. The area 14 surrounding the two plots 12,13 represents the ion distribution entering the mass filter 6, which is the same as the distribution of ions leaving the IMS device 4 and which is shown in FIG. 2A. It will be observed from FIG. 2B that the mass filter 6 mass selectively transmits only a relatively narrow range of mass to charge ratios at any given drift time. Therefore, only a relatively small number of ions are transmitted at any given time. The mass filter 6 is varied with IMS device 4 drift time so as to substantially only transmit ions of interest and to filter out other ions. For example, the mass filter 6 may be varied with time so as to substantially only transmit ions having a combination of IMS device drift time and mass to charge ratio that correspond to lipid ions or multiply charged peptide ions.

According to the embodiment in FIG. 2B, the mass to charge ratios transmitted by the mass filter 6 increase with time to pass a first band of ions 12. The mass to charge ratios transmitted by the mass filter 6 is then varied in a discontinuous manner such that the mass filter 6 begins transmitting mass to charge ratios in a second band of ions 13. This allows the mass filter 6 to transmit ions of interest that follow two different trends of mass to charge ratio and ion mobility.

FIG. 2B shows two regions 12,13 within a single IMS cycle being selected by the quadrupole mass filter 6 for onward transmission to the ion trap 10. However, it is contemplated that the mass selective transmission may occur over multiple IMS cycles rather than a single cycle. The same regions may be selected for onward transmission to the ion trap 10 in the multiple IMS cycles. Alternatively, different regions may be selected for onward transmission to the ion trap 10 in different IMS cycles. The region selected for onward transmission to the ion trap 10 may correspond to target ions of a single mass to charge ratio, only limited by the resolution of the quadrupole 6, or may correspond to bands in the mass to charge ratio and drift time space, as shown in FIG. 2B, corresponding to groups of ions such as lipids or multiply charged peptides.

The preferred embodiments significantly reduce the ion current entering the ion trap 10 by using the IMS device 4 and quadrupole mass filter 6 to selectively transmit ions to the ion trap 10. This approach increases the instrument sensitivity for the ions of interest. For example, if the optimum number of charges in the ion trap 10 is $10^6$ charges and the incoming ion current at the ion trap 10 is $10^9$ charges per second, then according to conventional techniques the instrument sensitivity would need to be reduced by a factor of $10^3$ for a nominal analysis cycle time of one second. In contrast, assuming a uniform intensity distribution for the ions in the embodiment of FIGS. 2A and 2B, the ion current incident on the ion trap 10 has reduced by an order of magnitude (i.e. the approximate ratio of the two areas 12,13 to the surrounding area 14 in FIG. 2) to $10^8$ charges per second. This means that the instrument sensitivity need only be reduced by a further factor of $10^2$ in order to achieve the optimum number of charges in the ion trap 10 (i.e. $10^6$). Accordingly, this approach results in an order of magnitude increase in sensitivity for the ions of interest as compared to the conventional approach described above.

Referring back to FIG. 1, the mass spectrometer may comprises an attenuation device 8 arranged between the mass filter 6 and the ion trap 10. The ions that are allowed to pass through the mass filter 6 then pass to the attenuation device 8. If the intensity of the ion beam is too high, even after being mass filtered, and would cause space-charge problems in the ion trap 10 then the attenuation device 8 may be operated so as to attenuate the ion beam. This reduces the rate of charge entering the ion trap 10 still further in addition to the function or the mass filter 6. Alternatively, the attenuation device 8 may only periodically allow ions to enter the ion trap 10. The attenuation device 8 therefore helps to avoid excessive charges building in the ion trap 10 and the resulting space-charge effect problems. The ion trap 10 may be associated with a total charge desired to be within the ion trap 10 at any given time and the combination of the IMS device 4, mass filter 6 and attenuation device 8 may be operated so as to ensure that the charge within the ion trap 10 remains at or below this total charge. Although the attenuation device is arranged between the mass filter 6 and ion trap 10 in the illustrated embodiment, the attenuation device 8 may be arranged at other locations, such as upstream of the mass filter 6 or upstream of the IMS device 4.

The invention claimed is:

1. A method of mass spectrometry or ion mobility spectrometry comprising:
providing ions towards an ion trap mass analyser;
selecting a target maximum charge desired to be stored within the ion trap mass analyser; and
reducing the ion current passing to the ion trap mass analyser such that the ions entering the ion trap mass analyser do not cause the total charge within the ion trap mass analyser to rise above said target maximum charge, wherein said step of reducing the ion current passing to the ion trap mass analyser comprises reducing the ion current passing to the ion trap mass analyser by:
temporally separating the ions according to ion mobility in an ion mobility separator;
mass filtering the ions according to mass to charge ratio with a mass filter;
controlling the ion mobility separator and the mass filter so that target ions having selected combinations of ion mobility and mass to charge ratio are transmitted and enter the ion trap mass analyser and so that other ions having other combinations of ion mobility and mass to charge ratio are not transmitted and do not enter the ion trap mass analyser; and
attenuating the transmitted target ions having the selected combinations of ion mobility and mass to charge ratio; and
wherein said method further comprises:
accumulating the attenuated target ions within the ion trap mass analyser during an ion accumulation period; and
the ion trap mass analyser mass analysing the accumulated ions;
wherein the ion mobility separator performs plural ion mobility separation cycles; wherein for each of said plural ion mobility separation cycles, ions are pulsed into the ion mobility separator, the ions separate according to their ion mobilities, and the ions then exit the ion mobility separator; and wherein attenuating the ions comprises transmitting ions to the ion trap mass analyser from only some of said plural ion mobility separation cycles and not others.

2. The method of claim 1, wherein the mass to charge ratios of the ions transmitted to the ion trap mass analyser by the mass filter vary with time such that different ions are transmitted by the mass filter at different times.

3. The method of claim 1, wherein the mass filter is arranged downstream of the ion mobility separator and wherein the mass to charge ratios of the ions transmitted by the mass filter vary as a function of the drift time of the ions through the ion mobility separator such that only ions having selected combinations of drift times and mass to charge ratios are transmitted to the ion trap mass analyser.

4. The method of claim 1, wherein the mass to charge ratios of the ions transmitted by the mass filter vary with time in a continuous manner or in a stepped manner.

5. The method of claim 1, wherein said steps of separating and mass filtering the ions are not used to select the charge states of ions transmitted.

6. The method of claim 1, wherein ions are pulsed into the ion mobility separator in a plurality of pulses of ions, wherein the mass to charge ratio transmittal window of the mass filter is varied with drift time as the ions from each pulse emerge from the ion mobility separator; and wherein the mass to charge ratio transmittal window of the mass filter is varied with drift time in the same manner for each pulse of ions pulsed into the ion mobility separator.

7. The method of claim 1, wherein ions are pulsed into the ion mobility separator in a plurality of pulses of ions, wherein the mass to charge ratio transmittal window of the mass filter is varied with drift time as the ions from each pulse emerge from the ion mobility separator; and wherein the mass to charge ratio transmittal window of the mass filter is varied with drift time in a different manner for each pulse of ions pulsed into the ion mobility separator.

8. The method of claim 1, wherein ions are transmitted to the ion trap mass analyser from a plurality of consecutive ion mobility separation cycles.

9. The method of claim 1, wherein ions are transmitted to the ion trap mass analyser from n complete ion mobility separation cycles, wherein n is an integer and $n \geq 1$; $n \geq 2$; $n \geq 3$; $n \geq 4$; $n \geq 5$; $n \geq 6$; $n \geq 7$; $n \geq 8$; $n \geq 9$; $n \geq 10$; $n \geq 15$; $n \geq 20$; or $n \geq 25$.

10. The method of claim 1, comprising performing an ion blocking mode that prevents ions being transmitted to the ion trap mass analyser other than when said target ions from an integer number of complete ion mobility separation cycles are being transmitted to the ion trap mass analyser.

11. The method of claim 10, wherein the ion blocking mode comprises applying a voltage to the mass filter or another component that causes all ions to be unstable in the mass filter, or that forms a potential barrier for ions, such that ions are not transmitted to the ion trap mass analyser in the ion blocking mode.

12. The method of claim 1, wherein said ion trap mass analyser is a Fourier Transform ion trap mass analyser.

13. The method of claim 1, further comprising releasing ions from the ion trap mass analyser to an ion mobility analyser and analysing the ions therein.

14. The method of claim 1, wherein the ion accumulation period is the period of time over which target ions are accumulated within the ion trap mass analyser, substantially without target ions being released from the ion trap mass analyser.

15. The method of claim 1, wherein the step of attenuating the transmitted target ions reduces the ion current passing to the ion trap mass analyser by a factor that is less than the factor that the ion current would need to be reduced to prevent the total charge within the ion trap mass analyser from rising above the target maximum charge if the steps of temporally separating the ions, mass filtering the ions and controlling the ion mobility separator and the ion mass filter were not performed.

16. The method of claim 1, comprising controlling the sensitivity of the spectrometer by controlling the number of ion mobility separation cycles for which ions are transmitted to the ion trap mass analyser.

17. A mass spectrometer or ion mobility spectrometer comprising:
   an ion source;
   an ion trap mass analyser having a target maximum charge desired to be stored within the ion trap mass analyser;
   an ion mobility separator for separating ions according to ion mobility;
   a mass filter for mass filtering ions according to mass to charge ratio;
   wherein the ion mobility separator and mass filter are arranged between the ion source and the ion trap mass analyser;
   said spectrometer arranged and configured for reducing the ion current passing from the ion source to the ion trap mass analyser such that the ions entering the ion trap mass analyser do not cause the total charge within the ion trap mass analyser to rise above said target maximum charge, wherein the spectrometer reduces the ion current passing to the ion trap mass analyser by:
   temporally separating the ions according to ion mobility in the ion mobility separator;
   mass filtering the ions according to mass to charge ratio with the mass filter;
   controlling the ion mobility separator and the mass filter so that target ions having selected combinations of ion mobility and mass to charge ratio are transmitted and enter the ion trap mass analyser and so that other ions having other combinations of ion mobility and mass to charge ratio are not transmitted and do not enter the ion trap mass analyser; and
   attenuating the transmitted target ions having the selected combinations of ion mobility and mass to charge ratio; and
   wherein the spectrometer causes the attenuated target ions to be accumulated within the ion trap mass analyser during an ion accumulation period, and causes the ion trap mass analyser to mass analyse the accumulated ions;
   wherein the ion mobility separator performs plural ion mobility separation cycles;
   wherein for each of said plural ion mobility separation cycles, ions are pulsed into the ion mobility separator, the ions separate according to their ion mobilities, and the ions then exit the ion mobility separator; and wherein attenuating the ions comprises transmitting ions to the ion trap mass analyser from only some of said plural ion mobility separation cycles and not others.

18. A method of mass spectrometry or ion mobility spectrometry comprising:
   providing first ions towards an ion reaction region;
   selecting a target maximum charge desired to be stored within the ion reaction region;
   providing reactant ions or molecules in the reaction region; and
   reducing the ion current passing to the ion reaction region such that the ions entering the reaction region do not cause the total charge within the reaction region to rise above said target maximum charge, wherein said step of reducing the ion current passing to the reaction region comprises reducing the ion current passing to the reaction region by:
   temporally separating the first ions according to their ion mobility in an ion mobility separator;
   mass filtering the first ions according to mass to charge ratio with a mass filter;
   controlling the ion mobility separator and the mass filter so that only target ions having selected combinations of ion mobility and mass to charge ratio are transmitted and enter the ion reaction region and so that other ions having other combinations of ion mobility and mass to charge ratio are not transmitted and do not enter the ion reaction region; and
   attenuating the transmitted target ions having the selected combinations of ion mobility and mass to charge ratio; and
   reacting the attenuated target ions with the reactant ions or molecules in the reaction region so as to produce product ions;
   wherein the ion mobility separator performs plural ion mobility separation cycles;
   wherein for each of said plural ion mobility separation cycles, ions are pulsed into the ion mobility separator, the ions separate according to their ion mobilities, and the ions then exit the ion mobility separator; and wherein attenuating the ions comprises transmitting ions to the ion reaction region from only some of said plural ion mobility separation cycles and not others.

* * * * *